No. 792,733. PATENTED JUNE 20, 1905.
O. H. SCHOENHERR.
CRUSHING ROLL.
APPLICATION FILED APR. 11, 1904.

Witnesses

Otto H. Schoenherr
Inventor
by C.A.Snow & Co
Attorneys

No. 792,733. Patented June 20, 1905.

UNITED STATES PATENT OFFICE.

OTTO HERMAN SCHOENHERR, OF CARTERVILLE, MISSOURI.

CRUSHING-ROLL.

SPECIFICATION forming part of Letters Patent No. 792,733, dated June 20, 1905.

Application filed April 11, 1904. Serial No. 202,639.

*To all whom it may concern:*

Be it known that I, OTTO HERMAN SCHOENHERR, a citizen of the United States, residing at Carterville, in the county of Jasper and State of Missouri, have invented a new and useful Crushing-Roll, of which the following is a specification.

This invention relates to crushing-rolls for grinding-mills, and while it is applicable for crushing, grinding, mashing, pulverizing, and rolling any substances it is particularly designed for use in connection with ore-mills.

The object of the invention is to produce an improved assemblage of the core and shell whereby the latter is held against working loose upon the core and is capable of being conveniently removed and replaced when worn or damaged.

With this object in view the invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
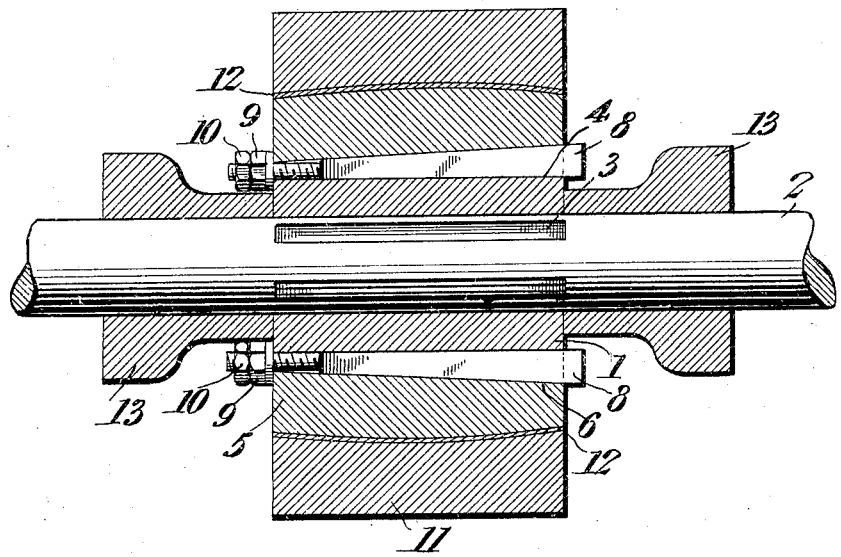
Figure 2:
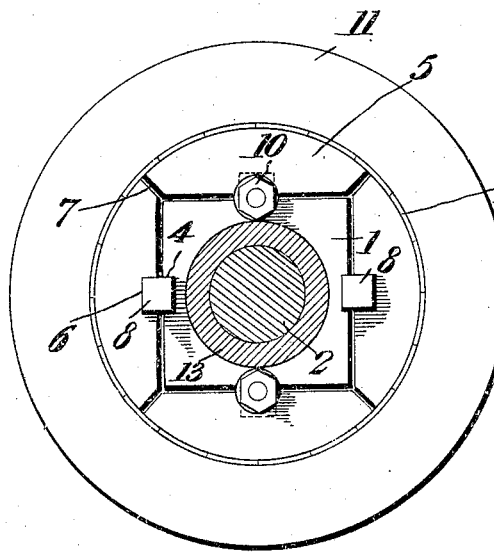
Figure 3:
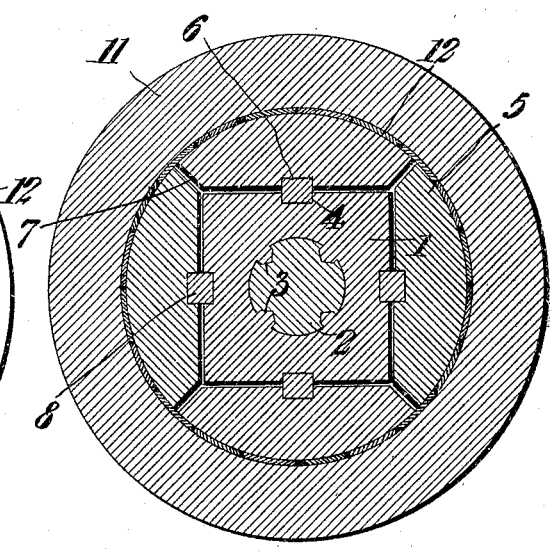

In the drawings, Figure 1 is a longitudinal sectional view of a crushing-roll embodying the features of the present invention. Fig. 2 is an end view thereof. Fig. 3 is a cross-sectional view of the roll.

Like characters of reference designate corresponding parts in each and every figure of the drawings.

In carrying out the present invention a non-circular and preferably rectangular hub 1 is cast upon the shaft 2, the latter being provided with an annular series of longitudinal grooves or seats 3, into which the metal of the hub flows during the molding thereof. Each external face of the hub is provided with a longitudinal open-ended groove or way 4, preferably polygonal in cross-section.

The hub is inclosed within a circular core made up of segmental sections 5, each of which fits snugly the adjacent external face of the hub, and is provided in its inner face with a longitudinal open-ended groove or way 6, registered with the adjacent groove of the hub, with their backs longitudinally inclined or beveled. The backs of the opposite grooves 6 incline or converge in the same direction; but the inclination of one pair is reverse to that of the other pair. The abutting longitudinal edges of adjacent core-sections are mitered, as indicated at 7.

Within each pair of registered grooves 4 and 6 a tapered key 8 is driven, both ends of the key being projected at opposite ends of the roll, with the small end screw-threaded and provided with a nut 9, bearing against the adjacent end of the roll, and a lock-nut 10 to prevent accidental loosening of the nut 9.

Encircling the periphery of the core is a circular ring or shell 11, the inner periphery of which is slightly concaved, so as to lie substantially parallel with the convexed outer periphery of the core, there being suitable filling-strips 12, preferably of wood, driven in between the core and the shell, so as to insure a snug and proper fit of the latter upon the former.

At opposite ends of the roll are spacing devices 13, the inner ends of which are reduced so as to fit between the adjacent ends of the keys and bear against the hub, while their outer ends are enlarged so as to bear against the supporting-frame, and thereby space the roll properly between the sides of the frame.

From the foregoing description it will be understood that after the parts have been assembled the keys 8 are driven or drawn up tight, so as to force the core-sections radially outward, and thereby snugly grip the yieldable filling-strips 12 between the core-sections and the shell, thereby effectually interlocking these members against slipping or peripheral creeping of the shell, the inner concave shape of the shell and the outer convex shape of the core preventing endwise working of the shell. By this construction the shell is always centered upon the shaft and does not require great care and skill in setting up the roll. Moreover, when the roll becomes worn or damaged the shell can be readily removed by loosening the keys and a new shell can be readily replaced.

Having thus described the construction and operation of my invention, what I claim as new, and desire to secure by Letters Patent, is—

1. A crushing-roll comprising a non-circular hub, a shell surrounding the hub, segmental core-sections interposed between the hub and the shell and extending at opposite sides of the middle of the hub and movable radially outward independently of the hub and the shell, and means to force the core-sections radially outward without endwise movement thereof to clamp the shell upon the core.

2. A crushing-roll comprising a non-circular hub, a shell surrounding the hub, segmental core-sections interposed between the non-circular hub and the shell and extending for the entire length of the hub, said sections capable of radial movement independently of the hub and the shell, and means to force the core-sections radially outward without endwise movement to clamp the shell upon the core.

3. A crushing-roll comprising a non-circular hub, a shell surrounding the hub, segmental core-sections interposed between the hub and the shell and projected at opposite sides of the middle of the hub, and wedge-shaped keys set in between the hub and the core-sections independently of said members to force the core-sections radially outward into engagement with the shell.

4. A crushing-roll comprising a hub, a shell surrounding the hub, segmental core-sections interposed between the hub and the shell and extending at opposite sides of the middle thereof, said core-sections capable of radial movements independently of the hub and the shell, the adjacent faces of the hub and the core-sections being provided with registering keyways, and tapered keys independent of the hub and the core driven into the keyways to force the core-sections radially outward and clamp the shell upon the core.

5. A crushing-roll comprising a hub, a shell surrounding the hub, segmental core-sections interposed between the hub and the shell and extending at opposite sides of the middle of the hub, said core-sections capable of radial movements independently of the hub and shell, the adjacent faces of the hub and core-sections having open-ended registering keyways, tapered keys driven into the respective keyways independently of the hub and core with their smaller ends threaded and projected at one end of the hub, and nuts fitted to the threaded ends of the keys and engaging the end of the hub.

6. A crushing-roll comprising a hub, a shell surrounding the hub, segmental core-sections interposed between the hub and the shell and extending at opposite sides of the middle of the hub, said core-sections capable of radial movements independently of the shell and the hub, the adjacent faces of the hub and core-sections having registering open-ended keyways, tapered keys driven into the keyways independently of the hub and core and divided into sets of reversely-tapered keys.

7. A crushing-roll comprising a hub, a shell surrounding the hub, segmental core-sections interposed between the hub and the shell and extending at opposite sides of the middle of the hub, said core-sections capable of radial movements independently of the hub and shell, longitudinal filling-strips interposed between the core and the shell, and means to force the core-sections radially outward without endwise movement to grip the filling-strips between the core and the shell.

8. A crushing-roll comprising a hub, a shell surrounding the hub having its inner periphery concaved longitudinally, segmental core-sections interposed between the hub and the shell and projected at opposite sides of the middle of the hub with their outer faces convexed longitudinally to correspond with the concaved inner periphery of the shell, said core-sections capable of radial movements independently of the hub and the shell, and means to force the core-sections radially outward without endwise movement to clamp the shell upon the hub.

9. A crushing-roll comprising a polygonal hub, a shell surrounding the hub and having its inner face concaved longitudinally, segmental core-sections interposed between the hub and the shell and extending at opposite sides of the middle of the hub, said core-sections having flat inner faces fitting the respective flat faces of the hub and longitudinal convexed outer faces corresponding to the longitudinal concaved inner face of the shell, each core-section capable of radial movement independently of the hub and the shell, the adjacent faces of the hub and the core-sections having open-ended registering keyways, tapered keys driven into the keyways and having their smaller ends threaded and projected externally of the hub, and nuts fitted to the threaded ends of the keys.

In testimony that I claim the foregoing as my own I have hereto affixed my signature in the presence of two witnesses.

OTTO HERMAN SCHOENHERR.

Witnesses:
 HERMON C. COLE,
 CHAS. P. WALLACE.